United States Patent
Rea, Sr. et al.

(10) Patent No.: US 7,498,703 B2
(45) Date of Patent: Mar. 3, 2009

(54) SHAFT SEALING ASSEMBLY

(75) Inventors: Michael J. Rea, Sr., Nacodoches, TX (US); Paul E. Yager, Nacodoches, TX (US); Ronald J. Thomas, Jr., Marion, NY (US)

(73) Assignee: Parker-Hannifin Corporation, Cleveland, OH (US)

( * ) Notice: Subject to any disclaimer, the term of this patent is extended or adjusted under 35 U.S.C. 154(b) by 380 days.

(21) Appl. No.: 11/417,607

(22) Filed: May 4, 2006

(65) Prior Publication Data

US 2006/0250038 A1   Nov. 9, 2006

Related U.S. Application Data

(60) Provisional application No. 60/678,037, filed on May 5, 2005.

(51) Int. Cl.
*H02K 11/00* (2006.01)

(52) U.S. Cl. ............... 310/71; 277/412; 277/421; 310/90

(58) Field of Classification Search .......... 310/71, 310/90, 85, 88, 89, 254, 91; 277/412, 421
See application file for complete search history.

(56) References Cited

U.S. PATENT DOCUMENTS

| | | | | |
|---|---|---|---|---|
| 3,890,515 | A | * 6/1975 | Fehr et al. ............... | 310/104 |
| 3,961,798 | A | * 6/1976 | Damratowski et al. ...... | 277/422 |
| 4,515,417 | A | * 5/1985 | Shiraishi ................. | 384/445 |
| 5,316,317 | A | 5/1994 | Fedorovich et al. ........ | 277/1 |
| 5,431,414 | A | 7/1995 | Fedorovich et al. ........ | 277/53 |
| 5,485,331 | A | * 1/1996 | Dunfield et al. .......... | 360/99.08 |
| 5,522,601 | A | 6/1996 | Murphy .................... | 277/53 |
| 5,735,530 | A | 4/1998 | Merkin et al. ............. | 277/412 |
| 5,821,646 | A | * 10/1998 | Chuta et al. .............. | 310/67 R |
| 5,967,524 | A | 10/1999 | Fedorovich ................ | 277/351 |
| 6,017,037 | A | 1/2000 | Fedorovich ................ | 277/419 |
| 6,024,362 | A | 2/2000 | Fedorovich ................ | 277/351 |
| 6,065,755 | A | 5/2000 | Fedorovich ................ | 277/421 |
| 6,142,479 | A | 11/2000 | Fedorovich ................ | 277/412 |
| 6,147,424 | A | * 11/2000 | Gomyo et al. ............. | 310/90 |
| 6,164,657 | A | 12/2000 | Merkin et al. ............. | 277/412 |

(Continued)

FOREIGN PATENT DOCUMENTS

IT   EP0394683   * 10/1990

OTHER PUBLICATIONS

Product Information Sheet; Inpro/Seal Company; Motor Grounding Seal (MGS).

(Continued)

*Primary Examiner*—Michael C Zarroli
(74) *Attorney, Agent, or Firm*—Renner, Otto, Boisselle & Sklar

(57) ABSTRACT

A shaft sealing assembly (10) for providing a seal between a shaft and a housing within which the shaft rotates. The sealing assembly (10) comprises a rotor (40) adapted to be mounted to the shaft and a stator (42) adapted to be mounted to the housing. The rotor (40) and the stator (42) include recesses and/or projections which mate and interlock to form a labyrinth lubricant chamber therebetween. The stator (42) carries at least one electrical-path-establishing element (88) which forms an electrically conductive path between the shaft and an electrical ground to thereby dissipate residual current and/or stray shaft voltage.

18 Claims, 5 Drawing Sheets

U.S. PATENT DOCUMENTS

| | | | | |
|---|---|---|---|---|
| 6,336,637 | B1 | 1/2002 | Fedorovich | 277/420 |
| 6,386,546 | B1 | 5/2002 | Fedorovich | 277/351 |
| 6,485,022 | B1 | 11/2002 | Fedorovich | 277/303 |
| 6,530,573 | B1 | 3/2003 | Merkin et al. | 277/53 |
| 6,670,733 | B2 * | 12/2003 | Melfi | 310/68 R |
| 6,726,214 | B2 | 4/2004 | Fedorovich | 277/419 |
| 2002/0121821 | A1 * | 9/2002 | Ritter | 310/71 |
| 2003/0086630 | A1 * | 5/2003 | Bramel et al. | 384/476 |
| 2004/0233592 | A1 | 11/2004 | Oh et al. | 361/23 |
| 2005/0063843 | A1 * | 3/2005 | Walker et al. | 417/423.3 |
| 2006/0007609 | A1 | 1/2006 | Oh et al. | 361/23 |

OTHER PUBLICATIONS

Press Release; New Motor Grounding Seal Prevents Shaft Current From Damaging AC Motor Bearings, Increases Productivity and Reliability, Eliminates Catastrophic Motor Failure.

CompressorTech; Ellen Hopkins; Bearing Isolators Can Deliver Extremely Long Service; Jun. 2005; pp. 36, 38, 40.

Sealing Technology; ISSN 1350-4789; Mar. 2006, pp. 1-16.

* cited by examiner

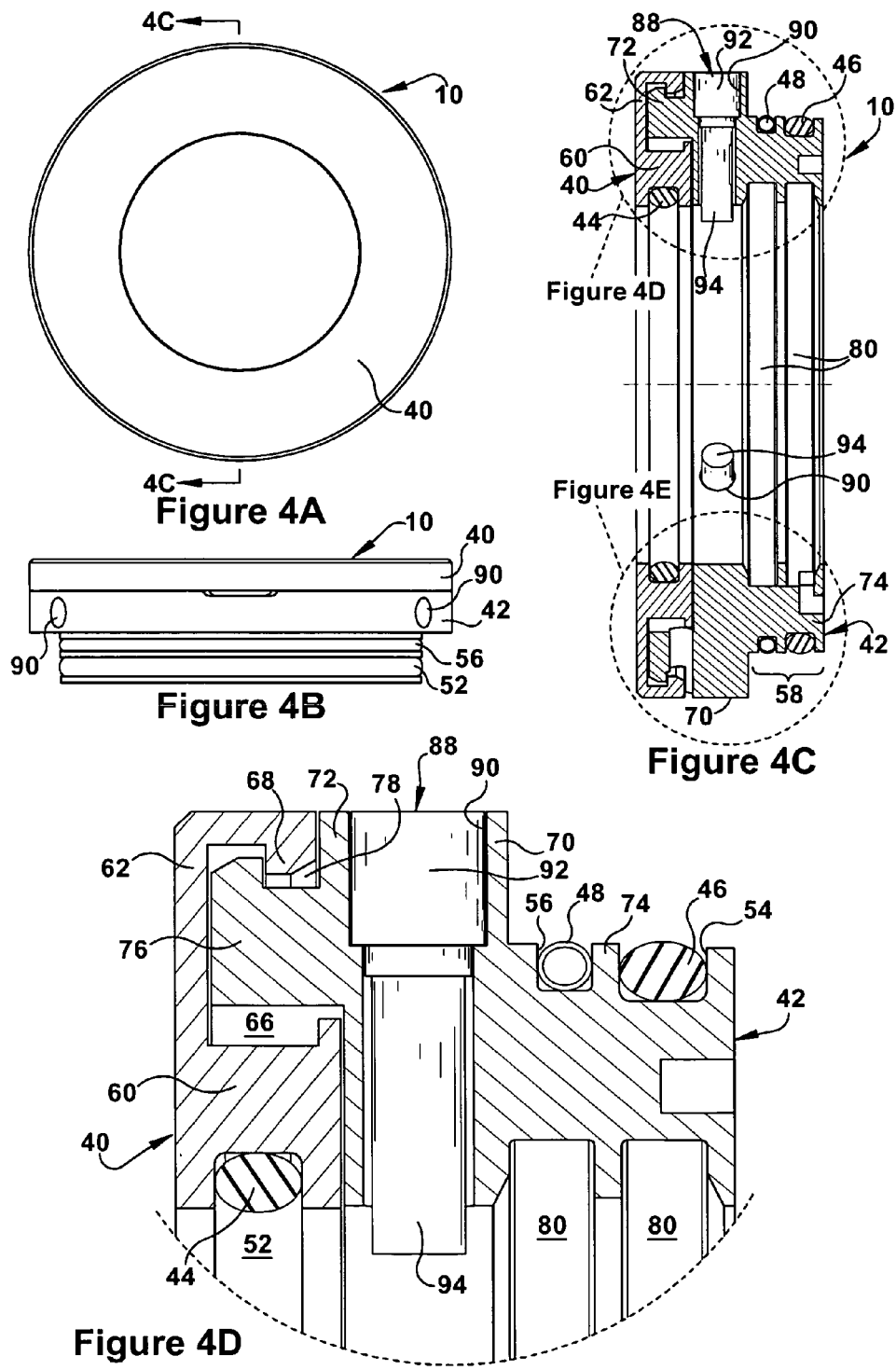

US 7,498,703 B2

SHAFT SEALING ASSEMBLY

RELATED APPLICATION

This application claims priority under 35 U.S.C. §119 (e) to U.S. Provisional Patent Application No. 60/678,037 filed on May 5, 2005. The entire disclosure of this provisional application is hereby incorporated by reference.

FIELD OF THE INVENTION

This invention relates generally to a motor shaft sealing assembly and, more particularly to a seal assembly for providing a seal between a shaft and a housing in which the shaft rotates.

BACKGROUND

An electric motor comprises a drive (e.g., a variable frequency drive), a rotor which rotated by the drive, a shaft which rotates with the rotor and supplies mechanical output to a load, and a stator within which the rotor rotates. The shaft, the rotor, and the stator are positioned within a housing, with the coupling end of the shaft usually extending outward from the housing. A bearing is mounted on the coupling end of the shaft to form a movable interface between it and the motor housing. A seal assembly, such as labyrinth sealing assembly, is typically provided on the coupling end of the shaft to prevent the leakage of lubricant from the bearing and/or to protect the bearing from outside contamination.

SUMMARY

A shaft sealing assembly provides a conductive electrical path between the motor shaft and an electrical ground to dissipate electrical charges from the shaft. Without such a dissipation, residual current and/or shaft voltage will accumulate on the rotor and discharge through the motor bearing. Random and frequent discharging can damage the bearing rolling elements and/or raceways allowing contaminants to accumulate and interfere with motor performance. In extreme cases, the electrical discharge damage can lead to catastrophic bearing failure. Moreover, certain safety standards limit the amount of acceptable electrical discharge (e.g., less than 15 mV on any rotating shaft) in manufacturing situations whereby, independent of bearing isolation issues, some type of electrical dissipation must be provided.

More particularly, the shaft sealing assembly comprises a sealing component adapted to be mounted to the housing and to participate in sealing the interface between the housing and the shaft. The sealing component carries at least one electrical-path-establishing element for forming an electrically conductive path between the shaft and the electrical ground. If the shaft sealing assembly comprises a rotor and stator interlocked to form a labyrinth interface therebetween, the stator can be the component that carries the electrical-path-establishing element(s).

The electrical-path-establishing element can be permanently mounted to, and/or formed in one piece with, the sealing component (e.g., the stator). For example, the electrical-path-establishing element can comprise a lip extending radially inward from the sealing component (e.g., the stator). Additionally or alternatively, the sealing component (e.g., the stator) can have radial passages through which the path-establishing(s) elements are inserted. For example, the element(s) can comprise tips of flexible electrically conductive filaments adapted to brush against the shaft during rotation thereof.

These and other features of the shaft sealing assembly are fully described and particularly pointed out in the claims. The following description and annexed drawings set forth in detail certain illustrative embodiments of the shaft sealing assembly, these embodiment being indicative of but a few of the various ways in which the principles of the invention may be employed.

DRAWINGS

FIGS. 4A-4C are front, side, and cross-sectional views of the seal assembly according to another embodiment.

FIGS. 4D and 4E are close-up views of certain regions of FIG. 4C.

DETAILED DESCRIPTION

Figure 1:
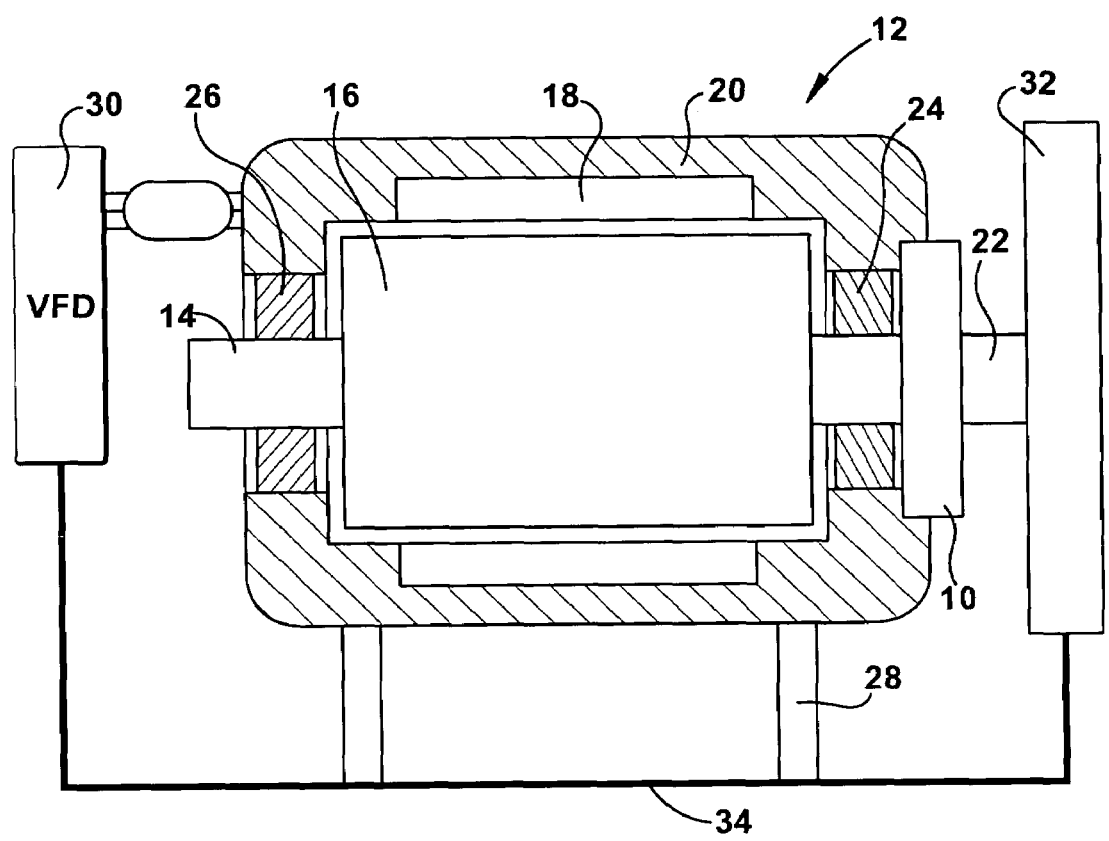
FIG. 1 is a schematic drawing of a motor with the shaft sealing assembly installed thereon.
Figure 2A:
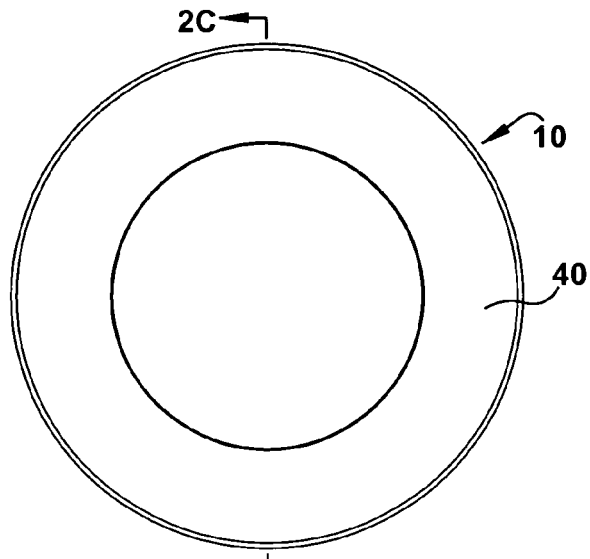
FIGS. 2A-2C are front, side, and cross-sectional views of the seal assembly according to one embodiment.
Figure 2B:
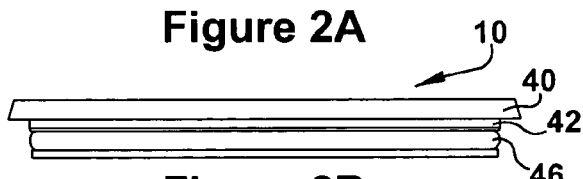
Figure 2C:
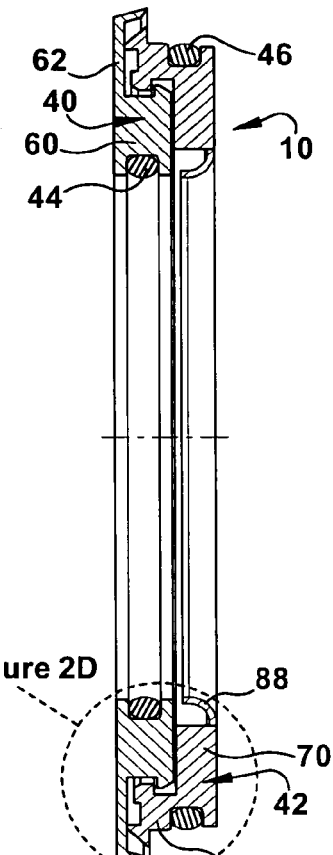
Figure 2D:
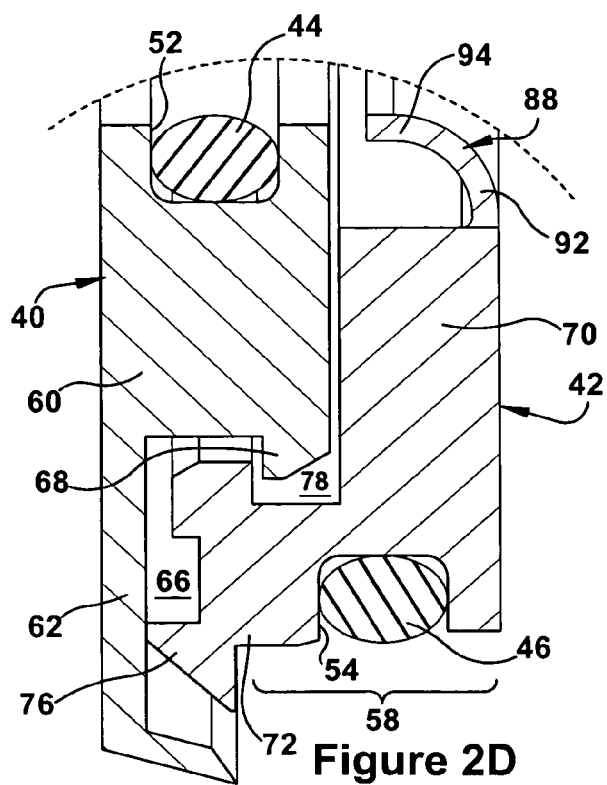
FIG. 2D is a close-up view of a certain region of FIG. 2C.
Figure 3A:
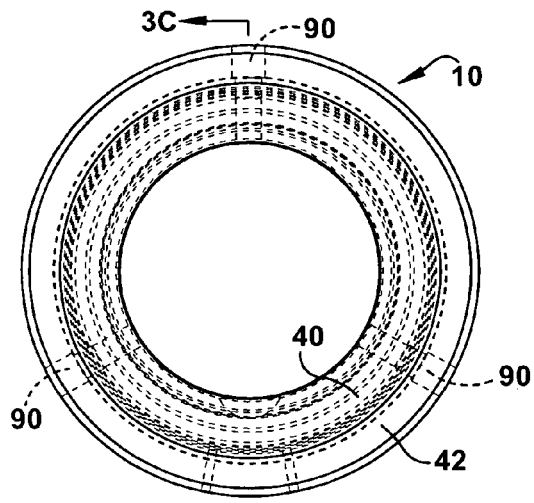
FIGS. 3A-3C are front, side, and cross-sectional views of the seal assembly according to another embodiment.
Figure 3B:
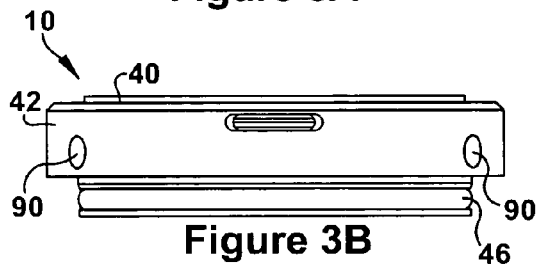
Figure 3C:
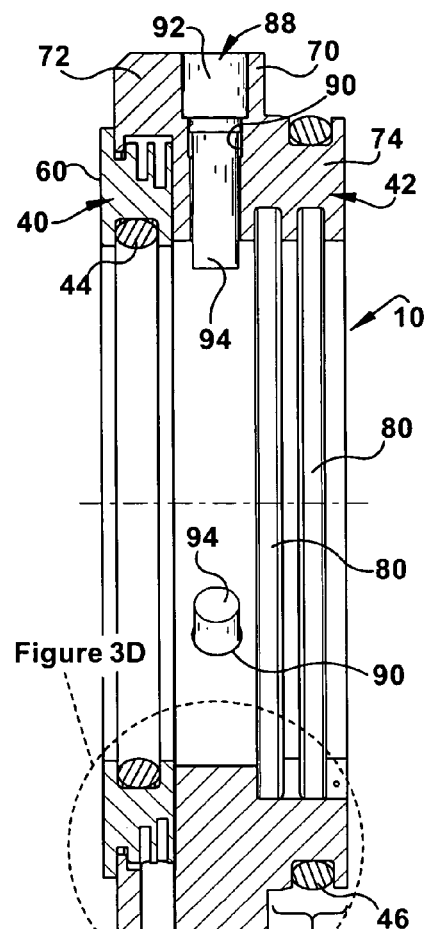
Figure 3D:
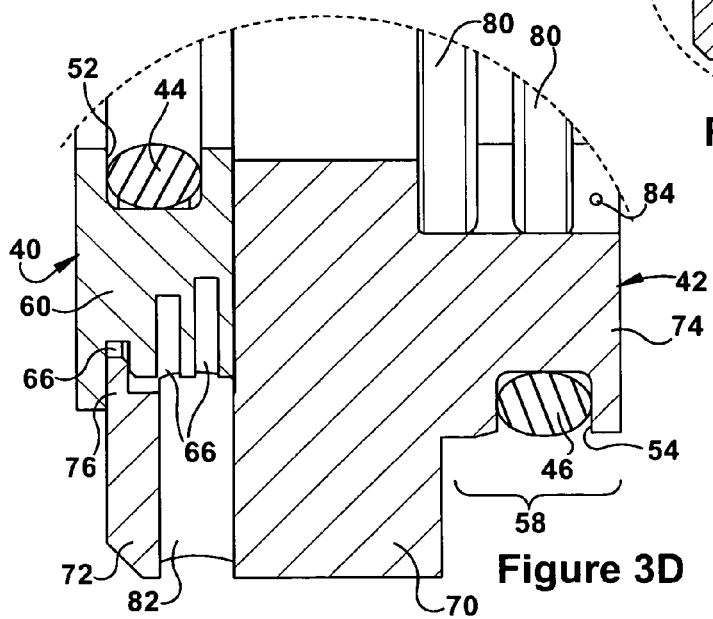
FIG. 3D is a close-up view of a certain region of FIG. 3C.
Figure 4E:
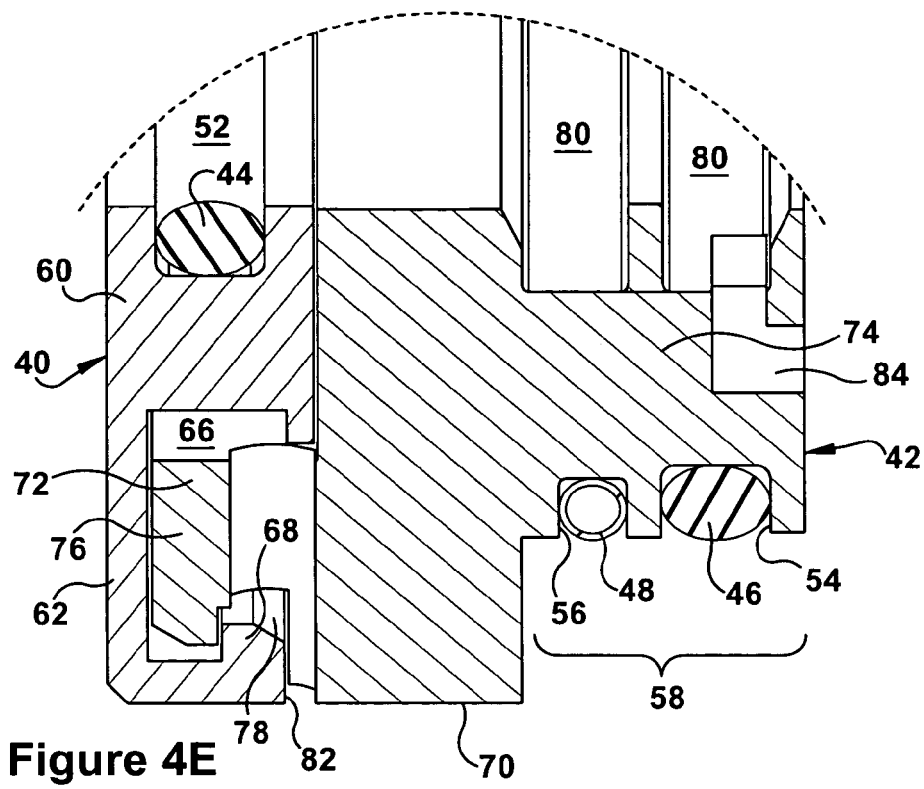

Referring now to the drawings, and initially to FIG. 1, a sealing assembly 10 is shown installed on an electrical motor 12. The electrical motor 12 generally comprises a shaft 14, a rotor 16 fixed to the shaft 14 to transfer rotational motion thereto, and a stator 18 within which the rotor 16 rotates. The shaft 14, the rotor 16, and the stator 18 are positioned within a housing 20, with a coupling end 22 of the shaft 14 extending from one end of the housing 20. A bearing 24 provides a rotatable interface between the shaft's coupling end 22 and the housing 20, and another bearing 26 may be provided on the opposite end of the shaft 14. The sealing assembly 10 is provided on the coupling end 22 of the shaft 14 to prevent the leakage of lubricant from the bearing 24 and/or to protect the bearing 24 from outside contamination.

A support structure 28 supports in the motor 12 in the desired orientation (e.g., horizontal in the illustrated embodiment.) In operation, the rotor 16 is rotated by electrical input from a drive 30 (e.g., a variable frequency drive), and the shaft 14 rotates with the rotor 16 to supply mechanical output to a load 32. The support structure 28, the drive 30, and the load 32 are electrically connected to an electrical ground 34. The assembly 10 provides, in addition to sealing and bearing isolation, an electrically conductive path between the shaft 14 and the electrical ground 34 to dissipate electrical charges from the shaft 14. This dissipation prevents, for example, residual current and/or shaft voltage accumulation on the rotor 16 and/or the discharge of current/voltage through the motor bearing 24.

Referring now to FIGS. 2A-2D, the sealing assembly 10 is shown in more detail. The sealing assembly 10 comprises a rotor 40 adapted for rotation with the motor shaft 12 and a stator 42 adapted for mounting to the housing 20. The rotor 40 and the stator 42 can be formed of any suitable material such as bronze, steel, or plastic (e.g., conductive Teflon) of an appropriate formulation. The sealing assembly 10 can comprise a shaft-side O-ring 44 and/or a housing-side O-ring 46. The rotor 40 includes a shaft-side groove 52 for receipt of the O-ring 44 and the stator 42 includes a shaft-side groove 54 for receipt of the O-ring 46.

When installed on the motor 12, an inner radial surface of the rotor 40 is press-fit on the coupling end 22 of the shaft 14. A ledge 58 surrounding the groove 54 on the stator 42 is sized for a metal-to-metal interference fit between it and the bore in the housing 12. The O-ring 44 provides a seal between the shaft 12 and the rotor 40, and the O-ring 46 provides a seal between the stator 42 and the housing 12, so as to exclude environmental corruption and/or to prevent lubricant leakage.

The rotor 40 and the stator 42 comprise mating recesses and/or mating projections which interlock so that an interface therebetween forms a labyrinth chamber for lubricant. In the illustrated embodiment, the rotor 40 comprises a main body 60 and a flange 62 extending radially outward therefrom to form a stator-mating axial recess 66 and a stator-mating radial projection 68. The stator 42 comprises a main body 70 and a flange 72 extending axially inward therefrom. The flange 72 forms an axial projection 76 which mates with the rotor recess 66 and a radial recess 78 for mating with the rotor projection 68. The O-ring groove 52 is situated on the inner surface of the main body 60 of the rotor 40 and the O-ring groove 54 is situated on the outer surface of the stator 42.

The sealing assembly 10 additionally comprises at least one electrical-path establishing element 88 which forms the electrically conductive path between the shaft 12 and the electrical ground 34. In this manner, residual current and/or stray voltage will pass from the shaft 12 to the element 88, to the housing 20, and through the support structure 28 to the electrical ground 34. In the sealing assembly shown in FIGS. 3A-3D, the path-establishing element 88 is part of the stator 42. The element 88 can be permanently fixed to the main body 70 of the stator 42 (and/or its flange 72) and/or it can be formed in one piece therewith.

The illustrated path-establishing element 88 is a thin lip having a curved base portion 92 extending from the main body 70 of the stator 42 and a tip portion 94 extending radially inward therefrom. The tip portion 94 rides against the shaft 12 to ensure electrical contact is established. The thin lip-like profile of the portions 92/94 allows at least a limited amount of flexing relative to the rest of the stator 42 to accommodate, for example, slight non-rotational movements and/or shifts of the shaft 12.

In the sealing assembly 10 shown in FIGS. 3A-3D, the rotor 40 comprises a main body 60 having a series of stator-mating recesses 66 on its radially outer surface and the O-ring-receiving groove 52 on its radially inner surface. The stator 42 comprises a main body 70 having a flange 72 extending axially inward therefrom and a flange 74 extending axially outward therefrom. It may be noted for future reference that the radially inner surface of the stator main body 70, and/or the radially inner surfaces of the stator flanges 72/74, are radially offset relative to the shaft-contacting surface of the rotor 40 whereby these flange surfaces will not contact the shaft 12.

The flange 72 comprises radially-inward projections 76 which mate with the rotor recesses 66 to form the labyrinth interface. The stator flange 72 extends radially around, but not axially beyond, the rotor main body 60. The other stator flange 74 has the ring-receiving groove 54 on its housing-side surface and one or more shaft-surrounding grooves 80 on its radially inner surface. The flange surfaces may be contoured, cut, or otherwise adapted to provide a drain 82, a drain 84, or any other drain appropriate for the intended sealing application.

The sealing assembly 10 shown in FIGS. 3A-3D comprises one or more electric-path-establishing elements 88 which extend through passages 90 in the stator 42 to form the electrically conductive path between the shaft 12 and the electrical ground 34. In the illustrated embodiment, three passages 90 extend through the stator main body 70 and are circumferentially spaced about the stator circumference. However, more or less passages, and/or different spacing arrangements are certainly possible and contemplated.

The elements 88 can each comprise a base portion 92 secured to the stator 42 and a tip portion 94 which extends radially inward from the stator 42 to contact the shaft 12. The contacting tip portion 94 preferably is flexible and, more particularly, comprises a plurality of flexible filaments for sweeping or brushing against the shaft 12 as it rotates during operation of the motor 12. The filaments can be made of a material (e.g., a carbon graphite composition) which is both adequately conductive to establish the electrical path and sufficiently lubricating to maintain low friction. The base portion 92 can be a cap or other conductive piece forming a bridge between the filaments and the housing 20. If the elements 88 have a brush-like construction, the passages 90 in the stator 42 can be viewed as brush-holders and have a stepped cross-sectional shape to accommodate the cap/brush portions 92/94.

In the illustrated embodiment, the stator 42 and the electrical-path-establishing elements 88 are designed for selective insertion and withdrawal of the elements 88 from the passages 90. Modifications wherein the stator 42 has the elements 88 permanently affixed thereto are certainly possible and contemplated. However, it is noted that the ability to insert/withdraw without any disassembly of the stator 42 (or even the rotor 40 in some cases) allows easy and/or periodic replacement of the elements 88. Thus, the life of the elements 88 will not dictate the life of the stator 42 (and/or the sealing assembly 10), and this can be particularly advantageous in situations where the elements 88 (especially the shaft-contacting tips 94) will be high-wear items.

In the sealing assembly 10 shown in FIGS. 4A-4E, a coil-spring 48 is provided to enhance bore contact between the housing 20 and the stator 42, and a groove 56 is provided in the stator 42 (and more particularly its flange 72) for receipt of the spring 48. The rotor 40 comprises a flange 62 extending radially outwardly from its main body 60 and forming a radial stator-mating recess 66 and an axial stator-mating projection 68. The stator 42 comprises a flange 72 forming a projection 76 which mates with the rotor recess 66 and a recess 78 which mates with the rotor projection 68 to produce the interlocking labyrinth interface. As in the sealing assembly 10 shown in FIGS. 3A-3D, one or more electric-path-establishing elements 88 extend through passages 90 in the stator 42 to form the electrically conductive path between the shaft 12 and the electrical ground 34.

Figure 5:
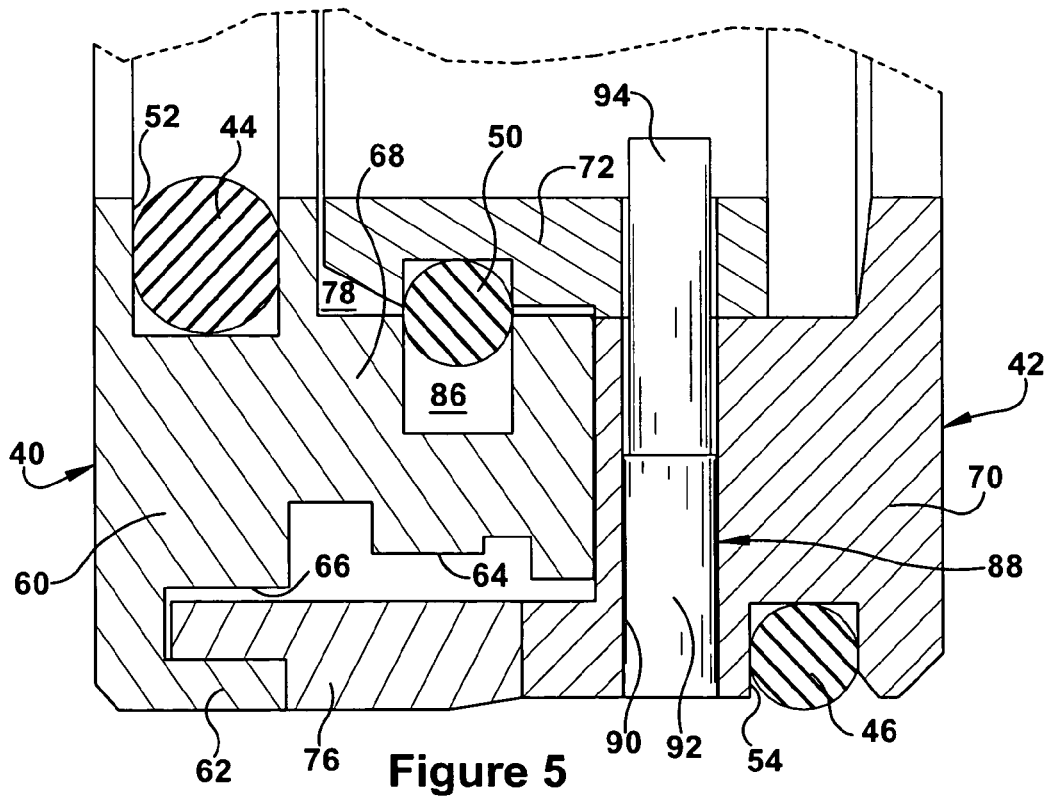
FIG. 5 is a cross-sectional view of the seal assembly according to another embodiment.

In the sealing assembly 10 shown in FIG. 5, a sealing and/or spring-biasing ring 50 is positioned between the rotor 40 and the stator 42. The rotor 40 comprises a main body 60, a flange 62 extending radially outward therefrom, and another flange 64 axially outward therefrom. The flange 62 forms a stator-mating recess 66 and the flange 64 forms a stator-mating projection 66. The stator 42 comprises a main body 70 and a flange 72 extending axially inward therefrom. The flange 72 forms a mating projection 76 for receipt within the rotor recess 66 and a mating recess 78 for receipt of the rotor projection 66 to form the labyrinth interface. The rotor flange 64 and the stator flange 72 also together form a recess 86 for receipt of the ring 50. As in the sealing assembly 10 shown in FIGS. 3A-3D and FIGS. 4A-4E, one or more electric-path-establishing elements 88 extend through passages(s) 90 in the stator 42 to form the electrically conductive path between the shaft 12 and the electrical ground 34.

One may now appreciate that the shaft sealing assembly 10 provides a conductive electrical path between the motor shaft 12 and the electrical ground 30 to dissipate electrical charges from the shaft 12. This dissipation eliminates the residual current and/or stray voltage that could otherwise accumulate on the rotor 14 (or other components) and discharge through the motor bearing 24 or otherwise. That being said, the shaft seal assembly 10 is not necessarily limited to motor applications, as it may be useful in other rotating shaft situations wherein electrical charge dissipation is necessary or desired. Although the shaft sealing assembly has been shown and described with respect to certain preferred embodiments, it is apparent that equivalent and obvious alterations and modifications will occur to others skilled in the art upon the reading and understanding of this specification. The present invention includes all such alterations and modifications and is limited only by the scope of the following claims.

The invention claimed is:

1. A shaft sealing assembly for providing a seal between a shaft and a housing within which the shaft rotates, said assembly comprising a sealing component adapted to be mounted to the housing and to participate in sealing the interface between the housing and the shaft;
    wherein the sealing component carries at least one electrical-path-establishing element for forming an electrically conductive path between the shaft and an electrical ground; and
    wherein the electrical-path-establishing element extends through a radial passage in the sealing component and has a tip portion for contacting the shaft during rotation thereof.

2. A shaft sealing assembly as set forth in claim 1, wherein the electrical-path-establishing element is permanently mounted to the sealing component.

3. A shaft sealing assembly as set forth in claim 1, wherein the electrical-path-establishing element can be selectively inserted and withdrawn from the sealing component without disassembly thereof.

4. A shaft sealing assembly as set forth in claim 1, wherein the tip portion of the electrical-path-establishing element comprises flexible electrically conductive filaments adapted to brush against the shaft during rotation therewith.

5. In combination, a shaft, a housing within which the shaft rotates, and the shaft sealing assembly set forth in claim 1, wherein the at least one electrical-path-establishing element forms an electrically conductive path between the shaft and the housing.

6. A motor comprising a shaft, a housing within which the shaft rotates, a support structure electrically connecting the housing to an electrical ground, and the shaft sealing assembly set forth in claim 1, wherein the at least one electrical-path-establishing element forms an electrically conductive path between the shaft and the housing.

7. A shaft sealing assembly for providing a seal between a shaft and a housing within which the shaft rotates, said assembly comprising a sealing component adapted to be mounted to the housing and to participate in sealing the interface between the housing and the shaft;
    wherein the sealing component carries at least one electrical-path-establishing element for forming an electrically conductive path between the shaft and an electrical ground; and
    wherein the electrical-path-establishing element comprises a lip extending radially inward from a main body and/or flange of the sealing component and having a tip portion positioned to contact the shaft during rotation thereof.

8. A shaft sealing assembly as set forth in claim 7, wherein the electrical-path-establishing element is formed in one piece with the sealing component.

9. A shaft sealing assembly for providing a seal between a shaft and a housing within which the shaft rotates, said assembly comprising a sealing component adapted to be mounted to the housing and to participate in sealing the interface between the housing and the shaft;
    wherein the sealing component carries a plurality of electrical-path-establishing elements for forming an electrically conductive path between the shaft and an electrical ground;
    wherein each of the electrical-path-establishing elements extend through a respective radial passage in the sealing component and can be selectively inserted/withdrawn without disassembly of the sealing component; and
    wherein each of the electrical-path-establishing elements has a tip portion comprising flexible electrically conductive filaments adapted to brush against the shaft during rotation therewith.

10. A shaft sealing assembly for providing a seal between a shaft and a housing within which the shaft rotates,
    said shaft sealing assembly comprising a rotor adapted to be mounted to the shaft and a stator adapted to be mounted to the housing and to participate in sealing the interface between the housing and the shaft;
    wherein the stator carries at least one electrical-path-establishing element for forming an electrically conductive path between the shaft and an electrical ground,
    wherein the rotor and the stator are interlocked and an interface therebetween forms a labyrinth chamber for lubricant; and
    wherein the rotor and the stator each comprise recesses and/or projections which mate and interlock to form the labyrinth chamber.

11. A shaft sealing assembly as set forth in claim 10, wherein the electrical-path-establishing element is permanently mounted and/or formed in one piece with the stator.

12. A shaft sealing assembly as set forth in claim 11, wherein the electrical-path-establishing element comprises a lip extending radially inward from a main body and/or flange of the stator and having a tip portion positioned to contact the shaft during rotation thereof.

13. A shaft sealing assembly as set forth in claim 10, wherein the electrical-path-establishing element extends through a radial passage in the stator and has a tip portion for contacting the shaft during rotation thereof.

14. A shaft sealing assembly as set forth in claim 13, wherein the electrical-path-establishing element can be selectively inserted into and withdrawn from the passages without disassembly of the stator.

15. A shaft sealing assembly as set forth in claim 14, wherein the tip portion of the electrical-path-establishing element comprises electrically conductive flexible filaments adapted to brush against the shaft during rotation therewith.

16. A shaft sealing assembly as set forth in claim 10, comprising a plurality of the electrical-path-establishing elements;
    wherein each of the electrical-path-establishing elements extend through a respective radial passage in the stator and can be selectively inserted/withdrawn without disassembly of the stator; and
    wherein each of the electrical-path-establishing elements has a tip portion comprising flexible electrically conductive filaments adapted to brush against the shaft during rotation therewith.

17. In combination, a shaft, a housing within which the shaft rotates, and the shaft sealing assembly set forth in claim 10, wherein the at least one electrical-path-establishing element forms an electrically conductive path between the shaft and the housing.

18. A motor comprising a shaft, a housing within which the shaft rotates, a support structure electrically connecting the housing to an electrical ground, and the shaft sealing assembly set forth in claim 10, wherein the at least one electrical-path-establishing element forms an electrically conductive path between the shaft and the housing.

* * * * *